United States Patent Office 3,121,067
Patented Feb. 11, 1964

3,121,067
FLAME RETARDANT MOLDABLE THERMOPLASTIC FORMULATIONS BASED UPON HYDROCARBON RESIN, CHLORINATED HYDROCARBON RESIN, AND ANTIMONY TRIOXIDE
William George Nelson IV, Wilmington, Del., assignor to E. I. du Pont de Nemours and Company, Wilmington, Del., a corporation of Delaware
No Drawing. Filed July 29, 1959, Ser. No. 830,196
3 Claims. (Cl. 260—41)

This invention relates to novel flame-retardant moldable thermoplastic formulations based on hydrocarbon resins.

It has been reported that flame-retardant properties are manifested by moldable thermoplastic formulations comprising 50 to 85% moldable flame-supporting hydrocarbon resin and, as flame-proofing constituents, a total of 15 to 50% complementally of antimony trioxide and highly chlorinated hydrocarbon wax containing 50 to 85% chlorine, cf. Happoldt U.S. Patent 2,480,298, issued August 30, 1949; Rugar U.S. Patent 2,590,211, issued March 25, 1952, and Bierly U.S. Patent 2,669,521, issued February 16, 1954. Such compositions are commercially available. They are, however, inferior in various valuable physical properties, and consequently, despite their economy, are unsuitable for use in a number of applications requiring excellent physical properties as well as flame-retardance. There is thus a need for improved formulations. The need is noteworthy even where the flame-retardance standard to be met is low, and only small quantities of flame-proofing constituents are required. It is especially marked where this standard is high and larger amounts of additives must be used, as for example where the formulation must pass such tests as ASTM D-635, ASTM D-747, or the Underwriter Laboratory, Inc. flame-retardance test (hereinafter referred to as the "UL test") described on page 17 of "Standards for Thermoplastic Insulated Wires" (third edition, 1948).

It is a general object of the present invention to provide novel flame-retardant moldable thermoplastic formulations. A more specific object is to provide formulations based on flame-supporting hydrocarbon resin compositions, which meet the various established flame-retardance standards, and at the same time afford better physical properties than formulations prepared according to the teachings of the earlier art.

The term "flame-retardant" is used herein to designate formulations which pass the following test, which is a refinement of the test described in the aforesaid Bierly patent: The sample used is a solid rectangular molded piece about 2.5 cm. long, 1.3 cm. wide, and 0.3 cm. thick. The sample is clamped with the lower larger surface in a horizontal position 5 cm. above the nozzle of a Bunsen burner. The burner is provided with a small pilot flame about 1.3 cm. high, and is preset to provide a main flame having a cone tip 5 cm. above the burner nozzle when gas is supplied for the purpose. Gas is then supplied for the main flame through a valve controlled by a timing device which is actuated to produce a main flame for a duration of five seconds. The formulation passes the test for flame-retardance if it either does not flame or ceases to flame within one second after the main flame of the Bunsen burner is extinguished. In contrast, the term "flame-supporting" is used herein to designate formulations which do not pass the above test, in that they flame for more than 1 second after the main burner flame is extinguished. Formulations which meet the requirements of the ASTM tests and the UL test are also qualified as "flame-retardant" by the foregoing test.

According to the present invention it has been found that the aforesaid objects can be achieved through the use as flame-proofing constituents of antimony trioxide and chlorinated hydrocarbon resins which contain less than 50 weight percent chlorine, provided the chlorine and antimony oxide are uniformly distributed within the formulation and are present in the proper amounts and relative proportions.

More specifically, it has been found that such formulations are fire-retardant when comprising in uniform admixture by weight a total of 9 to 50% of these flame-proofing constituents, if the antimony oxide constitutes at least 2% of the formulation, the chlorinated resin provides 2 to 18% chlorine in the formulation and at least an eighth as much chlorine as antimony trioxide, and the total of the percentage of antimony oxide in the formulation plus one-fifth of the percentage of chlorine supplied by the chlorinated resin in the formulation is at least 5.4. Moreover, such formulations meet the requirements of ASTM D-635 and ASTM D-757 when comprising a total of at least 15 percent of these flame-proofing constituents, if the antimony oxide constitutes at least 3.5%, the chlorinated resin provides at least 4% chlorine and at least a sixth as much chlorine as antimony trioxide, and the total of percentage antimony oxide plus one-fourth the percentage of chlorine is at least 8. In addition, such formulations meet the requirements of the UL test when comprising at least 18% flame-proofing constituents, if the antimony trioxide constitutes at least 5%, the chlorinated resin provides at least 4% chlorine and at least a fourth as much chlorine as antimony trioxide, and the total percentage of antimony oxide plus one-third the percentage of chlorine is at least 11. In formulations comprising less than 8% chlorine, the percentage of antimony trioxide is preferably in the range of one to three times the percentage of chlorine for maximum efficiency. With chlorine loadings above 8%, however, the preferred percentage of antimony oxide is such that the total of percentage of antimony oxide plus one-fourth the percentage of chlorine is in the range of 10 to 26. In general, the relative flame-retardance of the formulations at the optimum antimony trioxide level improves with increasing chlorine loading.

As moldable thermoplastics, the formulations of the present invention have melt indices in the range of 0.01 to 20 and preferably 0.5 to 3 as determined by the procedure of ASTM D-1238-52T at convenient molding temperature, ordinarily about 190° C. They comprise as components hydrocarbon and chlorinated hydrocarbon resins having, as resins in contrast to waxes, at least 350 carbon atoms per molecule and appreciable tensile strength and elongation when stressed at ordinary temperature.

The formulation may comprise in addition to the hydrocarbon resin and flame-proofing constituents up to about 10 weight percent of other additive modifiers such as fillers, colorants, stabilizers, antioxidants, lubricants and the like.

The hydrocarbon resin employed may in general be any moldable thermoplastic hydrocarbon resin. Such resins may be obtained in various ways known in the art, as for example by the polymerization of monoethylenically unstaurated hydrocarbon monomers of 2 to 18 carbon atoms, e.g. ethylene, propylene, butene, octene, norbonylene, bicyclopentadiene, styrene, methyl styrene and the like, or mixtures of two or more such monomers.

The chlorinated hydrocarbon resin employed may in general be any resin consisting essentially of carbon, hydrogen and chlorine and containing less than 50 weight percent chlorine. Such resins may be conveniently prepared by after-chlorination, preferably in solution, but operably in a slurry, of a suitable hydrocarbon resin, or by the addition polymerization of suitable monoethylenically unsaturated chlorohydrocarbon monomers, or by he copolymerization of suitable amounts of polymerization chlorohydrocarbon and hydrocarbon monomers. Chlorosulfonated hydrocarbon resins containing up to about 5 weight percent $SO_3$ may also be used. In general, however, solution-chlorinated hydrocarbon resins are preferred for ease of uniform mixing with the hydrocarbon resins. Preferably also to facilitate uniform mixing and achieve optimum physical properties the chlorinated resin will have melt indices which are in the approximate range of 0.1 to 30. In general for a given average number of carbon atoms in the molecular chain, the melt index of the chlorinated hydrocarbon resin decreases with increasing chlorine content, and at the same time some of the valuable characteristics which these resins contribute to the final formulation are impaired with increasing chlorine content, to the point that formulations with chlorinated resins containing more than about 50% chlorine have poorer overall physical properties than formulations containing chlorinated waxes. Accordingly for optimum physical properties, the chlorinated resin will contain the minimum percentage of chlorine consistent with flame-retardance requirements. For a favorable balance of economy and physical properties, however, the chlorinated resins preferably contain 20 to 48 percent chlorine, and are conveniently obtained by after-chlorinating hydrocarbon resins having melt indices in the range of 15 to 150 at 190° C.

Uniform mixing of the various constituents of the formulations is essential for reliable results, particularly with borderline quantities and proportions of flame-proofing constituents, and where maximum flame-retardance is desired. Although it is not intended to limit the invention by theory, it appears possible that the flame-retarding effect of the antimony and chlorine containing additives is due at least in part to antimony trichloride, formed at flame temperatures, which serves to shield the oxidizable constituents of the formulation and thus starves the flame. This theory is consistent with the fact that a transitory silver sheen can sometimes be seen on the surface of the formulations of the present invention when they are immersed in flame. It is also consistent with the finding that at low loadings of flame-proofing ingredients, lowest burning rates are achieved using chlorine loadings which would tend to provide, at the surface of the formulation when it is subjected to flame, approximately the stoichiometric proportions of chlorine and antimony trioxide to produce antimony trichloride. It is also consistent with the finding that at a given chlorine loading, the burning rate actually increases if the antimony oxide loading is too high, on the premise that under such circumstances the antimony trioxide can scavenge the chlorine without forming antimony trichloride.

In order to achieve uniform mixing it is advantageous to employ hydrocarbon resins and chlorinated hydrocarbon resins which have approximately the same viscosity characteristics at the blending temperature, which is preferably as low as practicable. It is also advantageous to use very finely divided antimony trioxide, preferably smaller than 200 mesh. The mixing operation may be carried out by first dry mixing the ingredients and then subjecting the dry mix to intensive mechanical working at elevated temperatures above the softening point of the resins, conveniently by means of compounding rolls, but preferably with a Banbury mixer or by screw extrusion through breaker plates, and continuing the working until a uniform mixture is obtained. Where the viscosity characteristics of the resins differ appreciably it is desirable to blend the antimony trioxide and chlorinated resin stabilizers into the chlorinated resin before adding the base resin and other additive modifiers for the formulation.

The invention is more specifically explained by means of the following illustrative and comparative examples, which are not necessarily intended to be limiting. In the examples all parts and percentages are by weight except as noted. For convenience, the various test values referred to in the examples are explained in the following Table I.

TABLE I (A) Flame-retardance, modified Bierly test previously described, pass or fail.
(B) Self-extinguishing, ASTM D–635–56T; pass, borderline, or fail.
(C) Burning rate, inches/minute, ASTM D–757–49.
(D) UL test, pass or fail.
(E) Melt index, ASTM D–1238–52T at 190° C.
(F) Density, ASTM D–792–50A, g./cc.
(G) Elongation, ASTM D–638–56T, 20 inches/minute at 23° C., percent.
(G′) Same as G, after aging sample 220 hours in air at 100° C., percent.
(H) Yield strength, ASTM D–638–56T, 20 inches/minute at 23° C., p.s.i.
(J) Exudation, 48 hours at 70° C. in dodecylphenyl-polyglycol ether, 12 glycol residues per molecule; none or high.
(K) Brass corrosion, 30 minutes pressure contact at 190° C., negative or positive.
(L) Abrasion resistance, G.E. abrasion tester, 1100 gram load, after aging sample 220 hours in air at 100° C.; strokes to failure.
(M) Stiffness, D–747–58T, p.s.i. at 23° C.
(N) Stress-crack resistance, Bell Laboratory test, ASTM Bulletin No. 218, 25–26 (December 1956).

*Examples 1 to 3*

In these examples there are compared the properties of two formulations of the present invention (Examples 1 and 2) and (Example 3), a typical formulation prepared according to the teachings of the U.S. Patent 2,480,298.

In Example 1 the formulation consisted of 58.2%.

(a) Polyethylene resin of melt index 2.2, density 0.92, containing 2% dibasic lead phosphite and 0.1% bis-(2-methyl-1,4-hydroxy - 5 - tertiary butylphenyl) sulfide; 18.5% of (b) Chlorinated hydrocarbon resin containing 46.5% chlorine, having a melt index of 21, obtained by the solution chlorination of polyethylene resin having a melt index of about 100 and a density of 0.92, and also containing as a stabilizer 4% of an epoxide polymer from epichlorohydrin and bis(hydroxyphenyl) propane having a melting point of about 9° C.; and 23.3% of (c) Antimony trioxide ground to pass a 200 mesh sieve.

In Example 2 the formulation consisted of the same ingredients in proportions of 79.1% (a), 9.3% (b), and 11.6% (c).

In Example 3 the formulation consisted of 56.2% of ingredient (a) above, 28.8% of ingredient (c) above, and 15% of commercial chlorinated paraffin wax containing 70% chlorine, and 4% of the epoxide polymer stabilizer of Examples 1 and 2.

In each of the examples the formulations were prepared by dry-mixing the ingredients and blending the mixture in a Banbury mixer for 20 minutes at 135–140° C. Thereafter molded or extruded samples of the formulations were prepared and tested with results as shown in Table II.

TABLE II

| Test | Example 1 | Example 2 | Example 3 |
|---|---|---|---|
| A | Pass | Pass | Pass. |
| B | Pass | Pass | Pass. |
| C | 0.50 | 0.56 | 0.66. |
| D | Pass | Pass | Pass. |
| E | 2.77 | 2.97 | 2.72. |
| F | 1.195 | 1.028 | 1.304. |
| G | 600 | 430 | 300. |
| G′ | 275 | 350 | 25. |
| H | 1,200 | 1,600 | 1,200. |
| J | None | None | High. |
| K | Negative | Negative | Positive. |
| L | 19,000 | >40,000 | 17,500. |

Examples 4–19

In these examples, there are compared formulations prepared in the manner of the preceding examples, and consisting of various amounts of ingredients (b) and (c) of the preceding examples, with a complemental amount of a copolymer of ethylene and octene-1, having a melt index of 1.51, a density of 0.945, a G value of 70, and an H value of 3960. The percentages of ingredients (b) and (c), together with the test results are summarized in Table III.

TABLE III

| Example # | Percent (b) | Percent (c) | Tests | | | | | |
|---|---|---|---|---|---|---|---|---|
| | | | A | B | C | G | H | E |
| 4 | 35 | 10 | Pass | Pass | 0.19 | 425 | 2,340 | 2.90 |
| 5 | 25 | 20 | do | do | 0.26 | 720 | 2,380 | 2.70 |
| 6 | 20 | 25 | do | do | 0.31 | 650 | 2,570 | 2.40 |
| 7 | 10 | 35 | do | Borderline | 0.51 | 120 | 2,440 | 2.00 |
| 8 | 27.2 | 7.8 | do | Pass | 0.26 | 1,100 | 2,560 | 2.39 |
| 9 | 19.4 | 15.5 | do | do | 0.22 | 820 | 2,610 | 2.05 |
| 10 | 15.5 | 19.4 | do | do | 0.24 | 480 | 2,670 | 2.16 |
| 11 | 7.8 | 27.2 | do | Borderline | 0.51 | 370 | 2,480 | 1.84 |
| 12 | 19.5 | 5.5 | do | Pass | 0.25 | 650 | 2,600 | 1.96 |
| 13 | 13.9 | 11.1 | do | do | 0.26 | 830 | 2,740 | 1.70 |
| 14 | 11.1 | 13.9 | do | do | 0.31 | 730 | 2,670 | 1.75 |
| 15 | 5.5 | 19.5 | do | Borderline | 0.51 | 670 | 2,610 | 1.74 |
| 16 | 11.7 | 3.3 | Fail | Fail | 0.60 | 720 | 2,660 | 1.82 |
| 17 | 8.3 | 6.8 | Pass | do | 0.60 | 650 | 2,820 | 1.68 |
| 18 | 6.8 | 8.3 | do | do | 0.60 | 620 | 2,780 | 1.70 |
| 19 | 3.3 | 11.7 | Fail | do | 0.71 | 620 | 2,640 | 1.76 |

Examples 20–24

The procedure of Examples 4 to 19 was repeated using, however, blending temperatures of 150–170° C. and using various percentages of the same ingredients (b) and (c), but with polyethylene having a density of 0.953, a melt index of 1.50, a G value of 75, and an H value of 4000. The results are summarized in Table IV.

TABLE IV

| Example # | Percent (b) | Percent (c) | Tests | | | | | |
|---|---|---|---|---|---|---|---|---|
| | | | A | B | C | G | H | E |
| 20 | 35 | 10 | Pass | Pass | 0.21 | 120 | 2,850 | 2.71 |
| 21 | 27.2 | 7.8 | do | do | 0.22 | 210 | 2,930 | 2.15 |
| 22 | 15.5 | 19.4 | do | do | 0.24 | 330 | 2,810 | 1.48 |
| 23 | 13.9 | 11.1 | do | do | 0.32 | 100 | 2,510 | 1.66 |
| 24 | 11.1 | 13.9 | do | do | 0.37 | 150 | 2,960 | 0.91 |

Examples 25–28

The procedure of Examples 4 to 19 was repeated using, however, a blending temperature of 160–180° C. and using various percentages of the same ingredients (b) and (c) but with polypropylene having a melt index of 0.98 and an M value of 120,000. The results are summarized in Table V.

TABLE V

| Example # | Percent (b) | Percent (c) | Tests | | | |
|---|---|---|---|---|---|---|
| | | | A | B | C | M |
| 25 | 38.5 | 11.1 | Pass | Pass | 0.19 | 69,000 |
| 26 | 27.8 | 22.2 | do | do | 0.19 | 86,400 |
| 27 | 22.2 | 27.8 | do | do | 0.21 | 93,800 |
| 28 | 20 | 25 | do | do | 0.17 | 83,700 |

Examples 29–32

In these examples, various amounts of finely divided antimony trioxide and various amounts of various chlorinated hydrocarbon resins containing various amounts of chlorine were blended with various hydrocarbon resins. In each case the formulations were prepared by milling the ingredients on compounding rolls at 140–160° C. for 20 minutes, and the formulations also included 2% of the phosphite stabilizer and 0.1% of the phenolic antioxidant of Example 1, based on hydrocarbon resins, and 4% of the epoxide polymer stabilizer of Example 1, based on the weight of chlorinated resin. These percentages of antioxidant and stabilizers are included in the percentages of hydrocarbon resin and chlorinated hydrocarbon resin.

Example 29

Formulation of (a) 60% polyethylene density 0.953 and melt index 3.1; (b) 20% chlorinated polyethylene containing 48.7% chlorine, obtained by solution chlorination of polyethylene resin of 0.92 density and 92 melt index, and (c) 20% antimony trioxide. Results: test A, pass; test B, pass; test C, 0.44; test G, 10; test H, 3350; test M, 106,000; test N, <20.

Example 30

Formulation as in Example 29 except that in (b) resin contained 30.1% chlorine. Results: test A, pass; test B, pass; test C, 0.54; test G, 880; test H, 2490; test M, 70,000; test N, 165.

Example 31

Formulations as in Example 29 except that in (b) the resin was chlorinated polyethylene containing 23% chlorine obtained by solution chlorination of polyethylene resin of 0.953 density and about 100 melt index. Results: test A, pass; test B, pass; test C, 0.49; test G, 930; test H, 2670; test M, 62,000; test N, 164.

Example 32

Formulation of (a) 68% resin as in (a) of Example 29, (b) 71% of chlorosulfonated polyethylene, containing 29% chlorine and 3% $SO_3$, obtained by solution chlorosulfonation of polyethylene resin of 0.92 density and about 100 melt index, and (c) 15% antimony oxide. Results: test A, pass; test B, pass; test C, 0.40.

It will be apparent from the foregoing that flame-retardant formulations having a broad range of desirable physical properties can be obtained by blending various kinds and amounts of ingredients in accordance with the present invention. In general, the formulations of the present invention have greater toughness, higher strength, markedly lower exudation and better aging qualities at elevated temperatures than corresponding flame-retardant formulations based on chlorinated wax, as well as lowered corrosive effect on brass. Formulations based on high density polyethylene have outstanding toughness values, as determined by Elmendorf tear strength measurement, when formulated with moderately chlorinated (30–40%) low density polyethylene; outstanding abrasion, resistance and stiffness when formulated with highly chlorinated (30–48%) high density polyethylene; high elongation when formulated with low to moderately chlorinated (20–40%) high density polyethylene. Formulations based on intermediate density copolymers of ethylene and moderate to highly chlorinated (30–48%) low density polyethylenes have outstanding environmental stress-crack resistance. Formulations based on low density polyethylene formulated with highly chlorinated (30–48%) low density polyethylene have high toughness. Formulations based on polypropylene with highly chlorinated (30–48%) low density polyethylene have high stiffness.

The formulations of the present invention are highly economical, especially where formulated to low density, and can be used to advantage in molded or extruded form wherever their flame-retardant properties and other desirable physical properties are important.

I claim:

1. A flame-retardant extrudable thermoplastic formulation consisting essentially, in uniform admixture per 100 parts by weight, of (a) 50–82 parts of a flame-supporting extrudable hydrocarbon resin composition, and a total of 18 to 50 parts complementally of (b) 5–42 parts of antimony trioxide, and (c) 8–45 parts chlorinated hydrocarbon resin having at least 350 carbon atoms per molecule, containing less than 50 weight percent combined chlorine, and providing 4–18 parts combined chlorine by weight per 100 parts of said formulation, the ratio of said parts of chlorine to said parts of oxide being at least ¼ and the sum of said parts of oxide and ⅓ said parts of chlorine being at least 11.

2. A flame-retardant extrudable thermoplastic formulation consisting essentially, in uniform admixture per 100 parts by weight, of (a) 62–82 parts of a flame-supporting extrudable hydrocarbon resin composition, and a total of at least 18 and less than 38 parts complementally of (b) 6–27 parts antimony trioxide and (c) 8–32 parts of chlorinated hydrocarbon resin having at least 350 carbon atoms per molecule, containing less than 50 weight percent combined chlorine, and providing between 4 and up to but not including 16 parts combined chlorine by weight per 100 parts of said formulation, the ratio of said parts of chlorine to said parts of oxide being at least ¼, and the sum of said parts of oxide and ⅓ said parts of chlorine being at least 11.

3. A flame-retardant extrudable thermoplastic formulation consisting essentially, in uniform admixture per 100 parts by weight, of (a) 50–82 parts of a flame-supporting extrudable hydrocarbon resin composition, and a total 18 to 50 parts complementally of (b) at least 5 and less than 20 parts antimony trioxide and (c) 8–45 parts of chlorinated hydrocarbon resin having at least 350 carbon atoms per molecule, containing less than 50 weight percent combined chlorine, and providing 4–18 parts combined chlorine by weight per 100 parts of said formulation, the ratio of said parts of chlorine to said parts of oxide being at least ¼ and the sum of said parts of oxide and ⅓ said parts of chlorine being at least 11.

References Cited in the file of this patent

UNITED STATES PATENTS

| | | |
|---|---|---|
| 2,480,298 | Happoldt | Aug. 30, 1949 |
| 2,588,362 | Danison | Mar. 11, 1952 |
| 2,590,211 | Rugar | Mar. 25, 1952 |
| 2,669,521 | Bierly | Feb. 16, 1954 |
| 2,830,919 | Schatzel | Apr. 15, 1958 |

UNITED STATES PATENT OFFICE
CERTIFICATE OF CORRECTION

Patent No. 3,121,067 February 11, 1964

William George Nelson IV

It is hereby certified that error appears in the above numbered patent requiring correction and that the said Letters Patent should read as corrected below.

Column 4, TABLE II, first column, line 8 thereof, for "G" read -- G' --; column 6, line 34, for "71%" read -- 17% --; lines 53 and 54, for "highyy" read -- highly --; line 64, for "30-48%" read -- 40-48% --.

Signed and sealed this 23rd day of June 1964.

(SEAL)
Attest:

ERNEST W. SWIDER
Attesting Officer

EDWARD J. BRENNER
Commissioner of Patents